United States Patent

Kisaka et al.

Patent Number: 5,576,102
Date of Patent: Nov. 19, 1996

[54] MAGNETO OPTICAL RECORDING MEDIUM

[75] Inventors: Yoshiyuki Kisaka, Gastonia, N.C.; Ichiro Nobuhara, Kurashiki, Japan; Seiki Nojiri, Kurashiki, Japan; Toshifumi Kawano, Machida, Japan

[73] Assignee: Mitsubishi Chemical Corporation, Japan

[21] Appl. No.: 253,326

[22] Filed: Jun. 3, 1994

Related U.S. Application Data

[63] Continuation of Ser. No. 913,685, Jul. 15, 1992, abandoned.

[30] Foreign Application Priority Data

Jul. 23, 1991 [JP] Japan .................... 3-182678

[51] Int. Cl.$^6$ ................ G11B 5/66; G11B 5/70; G11B 11/00
[52] U.S. Cl. ............ 428/336; 369/13; 428/412; 428/698; 428/694 RE; 428/694 RL; 428/694 ML; 428/900
[58] Field of Search ........... 428/694 OE, 694 XS, 428/694 RL, 694 NF, 694 AH, 900, 702, 694 RE, 694 ML, 412, 698; 369/13

[56] References Cited

U.S. PATENT DOCUMENTS 4,610,912  9/1986  Takahashr et al. ............. 428/213
5,093,174  3/1992  Suzuks et al. ............. 428/64

FOREIGN PATENT DOCUMENTS 239390   9/1987   European Pat. Off. .
3500314  7/1985   Germany .
116990   7/1984   Japan .
79954    3/1989   Japan .
166349   6/1989   Japan .
315051   12/1989  Japan .

OTHER PUBLICATIONS

Yoheyama et al "Effect of Thermal Interference in Thermo-magnetically Recorded Domains", IEEE Trans. Magn. vol. 25, No. 5, Sep. 1989 pp. 4042–4044.

Primary Examiner—Paul J. Thibodeau
Assistant Examiner—Michael LaVilla
Attorney, Agent, or Firm—Nixon & Vanderhye

[57] ABSTRACT

A magneto optical recording medium comprising the following elements has been developed:

- a substrate;
- an interference layer of tantalum oxide having 500 to 1,200 Å in thickness and formed on said substrate;
- a recording layer formed on said interference layer;
- a heat insulating layer of silicon nitride, silicon oxide or a mixture thereof having 200 to 500 Å in thickness and formed on said recording layer; and
- a reflective layer of Al or an Al-based alloy having 400 to 1,200 Å in thickness and formed on said heat insulating layer.

2 Claims, No Drawings

MAGNETO OPTICAL RECORDING MEDIUM

This is a continuation of application Ser. No. 07/913,685, filed Jul. 15, 1992, now abandoned.

BACKGROUND OF THE INVENTION

The present invention relates to a magneto optical recording medium used for optically recording and reproducing information.

In the art of optical memories, the magneto optical recording system has been put to practical use as an erasable memory which is capable of over writing and erasing. Presently, a thin film of an alloy composed of a rare-earth metal and a transition metal is most popularly used in view of its comprehensive properties, as the recording layer of the magneto optical recording media.

It has been disclosed to dispose a reflective layer on the recording layer of a magneto optical recording medium for improving the recording and reproducing performances of the recording medium when exposed to laser beam. It has been also proposed to dispose a heat insulating layer between the recording layer and the reflective layer for increasing the heating efficiency of the recording layer. It is possible to enlarge the power margin of recording light or to minimize the variation of sensitivity to recording pulse width by dint of the thermal effect of the said reflective layer or heat insulating layer.

There have been proposed various kinds of heat insulating layer and interference layer which is disposed between the substrate and the recording layer. However, there is yet available to ones which are well satisfactory in respects of adhesion to resin substrate, life-time under a high-temperature and high-humidity environmental, etc.

Thus, an offer of magneto optical recording medium which is excellent in layer adhesion to the substrate and long in life-time under high-temperature and high-humidity environments, that is, has excellent environmental resistance, and shows high sensitivity, CNR and power margin has been demanded.

As a result of the present inventors' studies in order to meet such a request, it has been found that in a magneto optical recording medium comprising, as laminated on a substrate, an interference layer, a recording layer, a heat insulating layer and a reflective layer, by using tantalum oxide for the interference layer and silicon nitride and/or silicon oxide for the heat insulating layer, the obtained magneto optical recording medium is markedly improved in adhesion between the substrate and the interference layer, suffers no decrease of life-time under high-temperature and high-humidity environments, that is, has excellent environmental resistance, and shows high sensitivity, CNR and power margin. The present invention has been achieved on the basis of this finding.

SUMMARY OF THE INVENTION

In an aspect of the present invention, there is provided a magneto optical recording medium comprising a substrate, an interference layer of tantalum oxide having 500–1200 Å in thickness and formed on the said substrate, a recording layer formed on the said interference layer, a heat insulating layer of silicon nitride, silicon oxide or a mixture thereof having 200–500 Å in thickness and formed on the said recording layer, and a reflective layer of Al or an Al-based alloy having 400–1200 Å in thickness and formed on the said heat insulating layer.

DETAILED DESCRIPTION OF THE INVENTION

As the substrate of the magneto optical recording medium according to the present invention, there may be used glass, plastic such as polycarbonate, acrylic resin, etc., or glass coated with a resin in a groove state. The thickness of the substrate is usually about 1 to 2 mm.

Alloys of rare-earth metals and transition metals, such as TbFe, TbFeCo, TbCo, DyFeCo, GdTbFeCo, etc., can be used for forming the recording layer. As the magneto optical recording layer, there may be used a single layer of the alloy mentioned above or a laminate composed of two or more layers such as GdFeCo and TbFe, TbFeCo and GdTbFeCo, or TbFeCo, GdFeCo and GdTbFeCo. The thickness of the magneto optical recording layer is preferably in the range of 200 to 300 Å. When the thickness of the recording layer exceeds 300 Å, the obtained recording medium may be deteriorated in sensitivity and CNR, and when the recording layer thickness is less than 200 Å, the produced recording medium may be lowered in CNR and become susceptible to oxidation.

An interference layer composed of tantalum oxide is disposed between the substrate and the recording layer. The purpose of the interference layer is to lower noise and improve sensitivity by reducing reflectance through the interference effect of light and to prevent oxidation of the recording layer from its substrate side. Tantalum oxide has better adhesiveness to the substrate than the conventional nitrides (SiN, AlN, etc.), and even if the substrate is expanded or contracted by heat or moisture, there takes place no peeling and cracking. The effect of tantalum oxide is especially notable when the substrate is plastic film. As for the composition of tantalum oxide, it is preferable that oxygen content therein is close to the stoichiometrical composition (Ta:O=2:5) or is slightly small therefrom (e.g. Ta:O=2:4.8–5). In other words, it is preferable that the interference layer composed of such composition has a refractive index of 2.1 to 2.3. The thickness of the interference layer is 500 to 1,200 Å. When the thickness exceeds 1200 Å reflectivity thereof tends to elevate excessively, and when the interference layer thickness is less than 500 Å, there is the tendency that reflectivity thereof becomes too high and CNR is lowered.

The heat insulating layer is provided for preventing the heat of the recording layer from being directly transferred to the reflective layer of high heat conductivity, thereby improving recording sensitivity. As the material of the heat insulating layer, there can be mentioned, for instance AlN, SiN, $Al_2O_3$, SiO, $SiO_2$, $TiO_2$, $Ta_2O_5$ and mixtures thereof. It is preferred to use SiN, SiO or $SiO_2$ which is relatively low in heat conductivity and reduces the reflectivity thereof. Being low in heat conductivity signifies large effect for improving sensitivity, and small reflectivity is favorable for elevating CNR by suppressing making the reflected light into elliptical. The thickness of the heat insulating layer is 200 to 500 Å. When the thickness exceeds 500 Å, CNR become to be lowered due to making the reflected light into elliptical, and when the thickness is 200 Å, the improving effect of the sensitivity becomes insufficient. It is preferred that the heat insulating layer has a refractive index of 1.4 to 2.3. For example, the refractive index of SiN heat-insulating layer, SiO heat-insulating layer and tantalum oxide heat-insulating layer is 1.6 to 2.2, 1.4 to 2.0 and 2.0 to 2.3, respectively.

A material with high heat-reflectivity and high heat-conductivity is used for the reflective layer. Examples of such material are Al, Au, Ag, Cu, Pt and the alloys composed of at least one of these elements as a main component. Al or an Al-based alloy is the preferred because of low cost and excellent corrosion resistance. Especially the Al alloys show very excellent corrosion resistance depending on other component. As the other component, Ta, Ti, Zr, Mo, etc., are usable. Particularly, addition of Ta in an amount of 1 to 3 atom % can provide the excellent properties to the reflective layer. The thickness of the reflective layer depends on the heat conductivity of the layer itself, but usually it is in the range of about 400 to 1,200 Å. The higher the heat conductivity of the layer, the smaller should be the layer thickness. When the thickness is too thick, the recording sensitivity, becomes to deteriorate, when the thickness is to thin, the recording power margin becomes to decrease.

On the reflective layer may be provided a protective layer of a known organic material such as an ultraviolet curing resin or a known inorganic material such as a thin ceramic film. The protective layer of an organic material preferably contains, as impurity, not more than 10 ppm of an alkali and/or an alkaline earth metal and also contains not more than 20 ppm of halogen ions. The thickness of the protective layer is preferably 1 to 12 μm in the case of the thin organic film and 500 to 2,000 Å in the case of the thin ceramic film.

Known techniques such as thermal deposition method, electron beam deposition method, CVD method and sputtering method can be used for forming the layers on the substrate. Sputtering method is especially preferred.

A process for producing a magnetic recording medium according to the present invention by using the sputtering method is described below.

A substrate is introduced into a sputtering chamber. After evacuating the chamber to not more than $8 \times 10^{-7}$ Torr, 50 to 500 ccm of argon and 10 to 60 ccm of oxygen are introduced into the chamber under a partial pressure of argon of $0.5 \times 10^{-3}$ to $3.5 \times 10^{-3}$ Torr and a partial pressure of oxygen of $0.2 \times 10^{-3}$ to $0.5 \times 10^{-3}$ Torr, using Ta as target, to form an interference layer of tantalum oxide.

After forming the tantalum oxide (TaOx) layer, 100 to 200 ccm of argon is introduced under an argon pressure of $1.7 \times 10^{-3}$ to $5.0 \times 10^{-3}$ Torr and etching is carried out at a power of 0.15 to 0.5 KW for 30 to 60 seconds, thereby etching of the surface of the tantalum oxide layer.

Then, 50 to 250 ccm of argon is introduced under $0.5 \times 10^{-3}$ to $5.0 \times 10^{-3}$ Torr on the surface of the tantalum oxide layer, using an alloy of a rare-earth metal and a transition metal as target, to form a recording layer.

Further, 40 to 350 ccm of argon, and 5 to 100 ccm of nitrogen are introduced under a partial pressure of argon of $0.8 \times 10^{-3}$ to $6.0 \times 10^{-3}$ Torr and a partial pressure of nitrogen of $0.1 \times 10^{-3}$ to $1.2 \times 10^{-3}$ Torr on the surface of the recording layer, using silicon as target, to form a heat insulating layer (siliconnitride).

On the other hand, silicon oxide is available for the insulating layer. 40 to 350 ccm of argon, and 1 to 10 ccm of oxygen are introduced under a partial pressure of argon of $0.8 \times 10^{-3}$ to $6.0 \times 10^{-3}$ Torr and a partial pressure of oxygen of $0.1 \times 10^{-3}$ to $1.2 \times 10^{-3}$ Torr on the surface of the recording layer, using silicon as target.

The mixture of silicon nitride and silicon oxide is available for the insulating layer. 40 to 350 ccm of argon, 5 to 100 ccm of nitrogen and 1 to 10 ccm of oxygen are introduced under a partial pressure of argon of $0.8 \times 10^{-3}$ to $6.0 \times 10^{-3}$ Torr, a partial pressure of nitrogen of $0.1 \times 10^{-3}$ to $1.2 \times 10^{-3}$ Torr and a partial pressure of oxygen of $0.1 \times 10^{-3}$ to $1.2 \times 10^{-3}$ Torr on the surface of the recording layer, using silicon as target.

Then, 50 to 300 ccm of argon is further introduced under $1.0 \times 10^{-3}$ to $4.0 \times 10^{-3}$ Torr, using a metal or alloy with high light-reflectivity and high heat-conductivity as target, to form a reflective layer.

A protective layer composed of a thin ceramic film is similarly formed by the sputtering method. A protective layer composed of an organic material is formed by coating the organic material by a suitable coating method such as spin coating and then curing the resultant coat by ultraviolet irradiation or other means.

The magneto optical recording medium of the present invention has the following characteristics: (1) the recording power ($p_{CNR\text{-}max}$) at which the maximum CNR can be obtained is 5 to 7 mW; (2) the maximum CNR ($CNR_{max}$) is not less than 48 dB; (3) the reflectivity of the mirror portion is 18 to 22%; (4) the error rate after allowing to stand the recording medium under a high-temperature (85° C.) and high-humidity (85% RH) condition for 500 hours is not more than $1 \times 10^{-4}$; (5) the ratio of the error rate after allowing to stand the recording medium under the said high-temperature and high-humidity condition for 500 hours ($Error_{500}$) to the error rate before conducting the said standing test ($Error_0$) is not more than 1.5 [$(Error_{500})/(Error_0) \leq 1.5$]; and (6) the recording power (power margin) at which CNR of not less than ($CNR_{max} - 3$ dB) can be obtained, is not less than 3.0 mW.

Thus, the magneto optical recording medium according to the present invention has is a high sensitivity, CNR and power margin as well as every excellent environmental resistance.

EXAMPLES

The present invention will be further illustrated below by showing the examples thereof. It is to be understood, however, that these examples are merely intended to be illustrative and not to be construed as limiting the scope of the invention.

Example 1

A 130 mmφ polycarbonate substrate was introduced into a sputtering chamber and the chamber was evacuated to not more than $8 \times 10^{-7}$ Torr. Then 60 ccm of Ar and 15 ccm of $O_2$ were introduced into the chamber and reactive sputtering was carried out with Ta as target to form an interference layer of tantalum oxide having a refractive index of 2.15 and 900 Å in thickness.

After once evacuating the chamber, 100 ccm of Ar was introduced and simultaneous sputtering was carried out by using Tb and $Fe_{90}Co_{10}$ (the numerical suffixes appearing here and hereinafter indicate atom %) as target to form a recording layer of $Tb_{20}(Fe_{90}Co_{10})_{80}$ having 250 Å in thickness.

Thereafter, 50 ccm of Ar and 10 ccm of $N_2$ were introduced and reactive sputtering was conducted with Si target to form a heat insulating layer of silicon nitride having a refractive index of 2.0 and 300 Å in thickness.

Finally, similar sputtering was carried out by using an AlTa alloy target to form a reflective layer of $Al_{98.5}Ta_{1.5}$ having 800 Å in thickness.

The recording and reproducing characteristics of the obtained recording medium are shown in Table 1.

Example 2

The recording medium was formed by following the same way as Example 1 except that the heat insulating layer was formed by introducing 50 ccm of Ar and 8 ccm of $O_2$ and carrying out reactive sputtering with Si target to form a silicon oxide film having a refractive index of 1.6 and 300 Å in thickness. The recording and reproducing characteristics of the obtained recording medium are shown in Table 1.

Example 3

The recording medium was formed by following the same way as Example 1 except that the heat insulating layer was formed by introducing 50 ccm of Ar, 7 ccm of $N_2$ and 3 ccm of $O_2$ and carrying out reactive sputtering with Si target to form a silicon oxide/silicon nitride film (N:O=4.5:5.5) having a refractive index of 1.8 and 300 Å in thickness. The recording and reproducing characteristics of the obtained recording medium are shown in Table 1.

Example 4

A polycarbonate substrate was introduced into a sputtering chamber and the chamber was evacuated as in Example 1, and then 150 ccm of Ar and 28 ccm of $O_2$ were introduced into the chamber and reactive sputtering was carried out with Ta as target to form an interference layer of tantalum oxide having a refractive index of 2.25 and 1,200 Å in thickness. On this interference layer was formed as the recording layer a $Tb_{20}(Fe_{90}Co_{10})_{80}$ layer having 250 Å in thickness. Then 100 ccm of Ar and 30 ccm of $N_2$ were introduced and reactive sputtering was performed with Si target to form a heat insulating layer of silicon nitride having a refractive index of 1.8 and 300 Å in thickness. Finally, a reflective layer having 800 Å in thickness was formed in the same way as Example 1 by using an AlTa alloy as target. The recording and reproducing characteristics of the obtained recording medium are shown in Table 1.

Example 5

The recording medium was formed by following the same procedure as Example 4 except that 100 ccm of Ar and 45 ccm of $N_2$ were introduced and reactive sputtering was carried out with Si target to form a heat insulating layer of silicon nitride having a refractive index of 1.6 and 300 Å in thickness. The recording and reproducing characteristics of the obtained recording medium are shown in Table 1.

Comparative Example 1

After introducing a polycarbonate substrate into a sputtering chamber and evacuating the chamber in accordance with Example 1, 60 ccm of Ar and 15 ccm of $O_2$ were introduced and reactive sputtering was carried out by using Ta as target to form an interference layer of tantalum oxide with a refractive index of 2.15 and 450 Å in thickness. Thereafter the same procedures as in Example 1 were conducted to form a recording medium. The recording and reproducing characteristics of this recording medium are shown in Table 1.

Comparative Example 2

A recording medium was formed by following the same procedure as Comparative Example 1 except that the thickness of the interference layer of tantalum oxide was made 1,300 Å. The recording and reproducing characteristics of this recording medium are shown in Table 1.

Comparative Example 3

An interference layer of tantalum oxide having 900 Å in thickness was formed, followed by formation of a recording layer of $Tb_{20}(Fe_{90}Co_{10})_{80}$ having 100 Å in thickness in accordance with Example 1. Then a heat insulating layer of SiN and a reflective layer of AlTa alloy was formed by following in the same way as Example 1 to produce a recording medium. The recording and reproducing characteristics of this recording medium are shown in Table 1.

Comparative Example 4

The recording medium was formed by following the same procedure as Example 1 except that a $Tb_{20}(Fe_{90}Co_{10})_{80}$ recording layer having 500 Å in thickness was formed. The recording and reproducing characteristics of this recording medium are shown in Table 1.

Comparative Example 5

After forming an interference layer of tantalum oxide and a recording layer of $Tb_{20}(Fe_{90}Co_{10})_{80}$ in accordance with Example 1, 50 ccm of Ar and 10 ccm of $N_2$ were introduced and Si target reactive sputtering was carried out to form a heat insulating layer of silicon nitride having a refractive index of 2.0 and 100 Å in thickness. Then, reflective layer of $Al_{98.5}Ta_{1.5}$ having 800 Å in thickness was formed by using an AlTa alloy target. The recording and reproducing characteristics of the obtained recording medium are shown in Table 1. C/N decreased by 1 dB and reflectance became not less than 25%.

Comparative Example 6

After forming an interference layer of tantalum oxide and a recording layer Of $Tb_{20}(Fe_{90}Co_{10})_{80}$ in accordance with Example 1, 50 ccm of Ar and 10 ccm of $N_2$ were introduced and Si target reactive sputtering was conducted to form a heat insulating layer of silicon nitride having a refractive index of 2.0 and 600 Å in thickness. Then, a reflective layer of $Al_{98.5}Ta_{1.5}$ having 800 Å in thickness was formed by using a target of AlTa alloy. The recording and reproducing characteristics of the obtained recording medium are shown in Table 1.

Comparative Example 7

After forming a tantalum oxide interference layer and a $Tb_{20}(Fe_{90}Co_{10})_{80}$ recording layer in accordance with Example 1, 50 ccm of Ar and 8 ccm of $O_2$ were introduced and Si target reactive sputtering was carried out to form a heat insulating layer of silicon oxide having a refractive index of 1.60 and 50 Å in thickness. Then, a reflective layer was formed with an AlTa alloy target in the same way as Example 1. The recording and reproducing characteristics of the obtained recording medium are shown in Table 1.

Comparative Example 8

After forming at tantalum oxide interference layer and a $Tb_{20}(Fe_{90}Co_{10})_{80}$ recording layer in accordance with Example 1, 50 ccm of Ar and 8 ccm of $O_2$ were introduced and Si target reactive sputtering was performed to form a heat insulating layer of silicon oxide having a refractive index of 1.60 and 600 Å in thickness, which was followed by formation of a reflective layer using an AlTa alloy target in the same way as Example 1. The recording and reproducing characteristics of the obtained recording medium are shown in Table 1.

Comparative Example 9

After forming a tantalum oxide interference layer, a $Tb_{20}(Fe_{90}Co_{10})_{80}$ recording layer and a SiN heat insulating layer in accordance with Example 1, a reflective layer of $Al_{98.5}Ta_{1.5}$ having 300 Å in thickness was formed by using an AlTa alloy target. The recording and reproducing characteristics of the obtained recording medium are shown in Table 1.

Comparative Example 10

After forming a tantalum oxide interference layer, a $Tb_{20}(Fe_{90}Co_{10})_{80}$ recording layer and a SiN heat insulating layer in accordance with Example 1, a reflective layer of $Al_{98.5}Ta_{1.5}$ having 1,300 Å in thickness was formed by using an AlTa alloy target. The recording and reproducing characteristics of the obtained recording medium are shown in Table 1.

Comparative Example 11

60 ccm of Ar and 10 ccm of $N_2$ were introduced and Si target, and the reactive sputtering was performed to form an interference layer of silicon nitride having a refractive index of 2.2 and 1,000 Å in thickness. Other layers were formed in the same way as Example 1. The recording and reproducing characteristics of the obtained recording medium are shown in Table 1.

As seen from Table 1, all of the Examples and Comparative Example 11 how good characteristics with regard to sensitivity, CNR and reflectivity. In contrast, Comparative Examples 1–10 are bad in at least one of sensitivity, CNR and reflectivity.

Further, regarding Examples 1–5 and Comparative Example 11 which showed good recording and reproducing characteristics, the increasing ratio of the drop-in error rate before and after 500-hour standing of the disc under an environment of 85° C. and 85% RH was determined. The results are shown in Table 2. In any of the Examples, the increasing ratio of error rate was less than 1.5, but the disc of Comparative Example 11 cracked in the whole surface and the increasing rat of error rate was unmeasurable.

TABLE 1

| Disc | $P_{CNRmax}$ (mW) | $CNR_{max}$ (dB) | Reflectivity of mirror area (%) | Power margin (mW) |
| --- | --- | --- | --- | --- |
| Example 1 | 6.2 | 49.0 | 20 | 3.7 |
| Example 2 | 5.8 | 48.6 | 19 | 4.0 |
| Example 3 | 6.0 | 48.8 | 19 | 3.7 |
| Example 4 | 6.2 | 49.0 | 20 | 3.5 |
| Example 5 | 6.0 | 48.8 | 20 | 3.7 |
| Comp. Example 1 | 5.4 | 46.2 | 23 | 4.0 |

TABLE 1-continued

| Disc | $P_{CNRmax}$ (mW) | $CNR_{max}$ (dB) | Reflectivity of mirror area (%) | Power margin (mW) |
| --- | --- | --- | --- | --- |
| Comp. Example 2 | 6.4 | 48.0 | 27 | 4.0 |
| Comp. Example 3 | 5.2 | 44.5 | 12 | 3.5 |
| Comp. Example 4 | 6.4 | 46.8 | 30 | 4.0 |
| Comp. Example 5 | 7.2 | 47.8 | 25 | 4.0 |
| Comp. Example 6 | 4.2 | 46.5 | 12 | 3.2 |
| Comp. Example 7 | 7.0 | 47.1 | 22 | 4.0 |
| Comp. Example 8 | 4.3 | 44.6 | 18 | 3.3 |
| Comp. Example 9 | 5.0 | 48.8 | 17 | 3.2 |
| Comp. Example 10 | 9.5 | 49.0 | 21 | 4.5 |
| Comp. Example 11 | 6.3 | 48.6 | 20 | 3.8 |

Measuring conditions:
1,800 r.p.m.; f = 3.7 MHz;
Tw = 60 ns; r = 30 mm;
Hb = 300 Oe
$P_{CNRmax}$: recording power at which maximum CNR can be obtained
$CNR_{max}$: maximum CNR
Reflectance:
reflectance of the mirror portion (mirror area)
Power margin:
the range of recording power in which CNR of not less than ($CNR_{max}$ − 3 dB) can be obtained

TABLE 2

| Disc | $Error_0$ | $Error_{500}$ | $Error_0/Error_{500}$ |
| --- | --- | --- | --- |
| Example 1 | $3.4 \times 10^{-5}$ | $3.8 \times 10^{-5}$ | 1.1 |
| Example 2 | $5.1 \times 10^{-5}$ | $6.3 \times 10^{-5}$ | 1.2 |
| Example 3 | $2.6 \times 10^{-5}$ | $3.5 \times 10^{-5}$ | 1.3 |
| Example 4 | $4.0 \times 10^{-5}$ | $4.4 \times 10^{-5}$ | 1.1 |
| Example 5 | $3.7 \times 10^{-5}$ | $4.6 \times 10^{-5}$ | 1.2 |
| Comp. Example 11 | $4.0 \times 10^{-5}$ | unmeasurable | — |

$Error_0$:
Error rate before allowing to stand the recording medium under a high-temperature and high-humidity condition
$Error_{500}$:
Error rate after allowing to stand the recording medium under a high-temperature and high-humidity condition for 500 hours
$P_{CNRmax}$, $CNR_{max}$, reflectivity and power margin were measured by a magneto optical disc inspection device OMSL 2000 (mfd. by Nakamichi Co., Ltd.).

What is claimed is:

1. A magneto optical recording medium comprising:

a substrate comprising polycarbonate;

an interference layer comprising tantalum oxide having a thickness of 500 to 1,200 Å and a refractive index of 2.1 to 2.3, on said substrate directly deposited;

a recording layer comprising a TbFeCo alloy having a thickness of 200 to 300 Å, on said interference layer directly deposited;

a heat insulating layer having a thickness of 200 to 500 Å, on said recording layer directly deposited, said heat insulating layer being a layer comprising silicon nitride having a refractive index of 1.6 to 2.2 or a layer comprising silicon oxide having a refractive index of 1.4 to 2.0; and a reflective layer of Al alloy containing Ta, wherein the atomic percentage of Ta is 1 to 3% of the atomic amount of Al, and having a thickness of 400 to 1,200 Å, on said heat insulating layer directly deposited.

2. A magneto optical recording medium according to claim 1, wherein a protective layer is directly deposited on the reflective layer.

* * * * *